E. A. BRADY.
WEATHER STRIP.
APPLICATION FILED MAY 15, 1917.
1,264,483.
Patented Apr. 30, 1918.
2 SHEETS—SHEET 1.
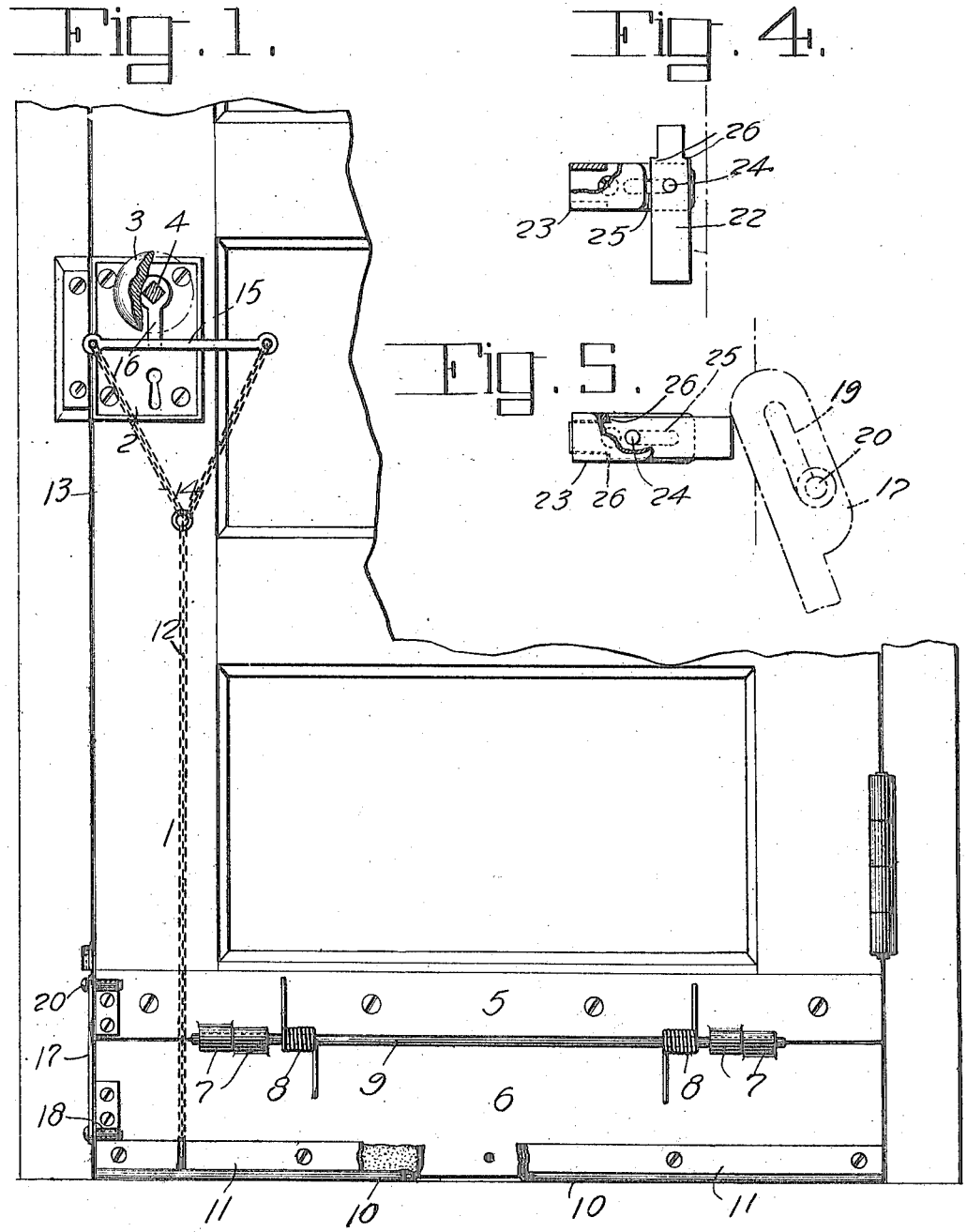
WITNESSES
Y. C. Barry
H. E. Beck
INVENTOR
EDWARD A. BRADY,
BY
ATTORNEYS E. A. BRADY.
WEATHER STRIP.
APPLICATION FILED MAY 15, 1917.
1,264,483.
Patented Apr. 30, 1918.
2 SHEETS—SHEET 2.
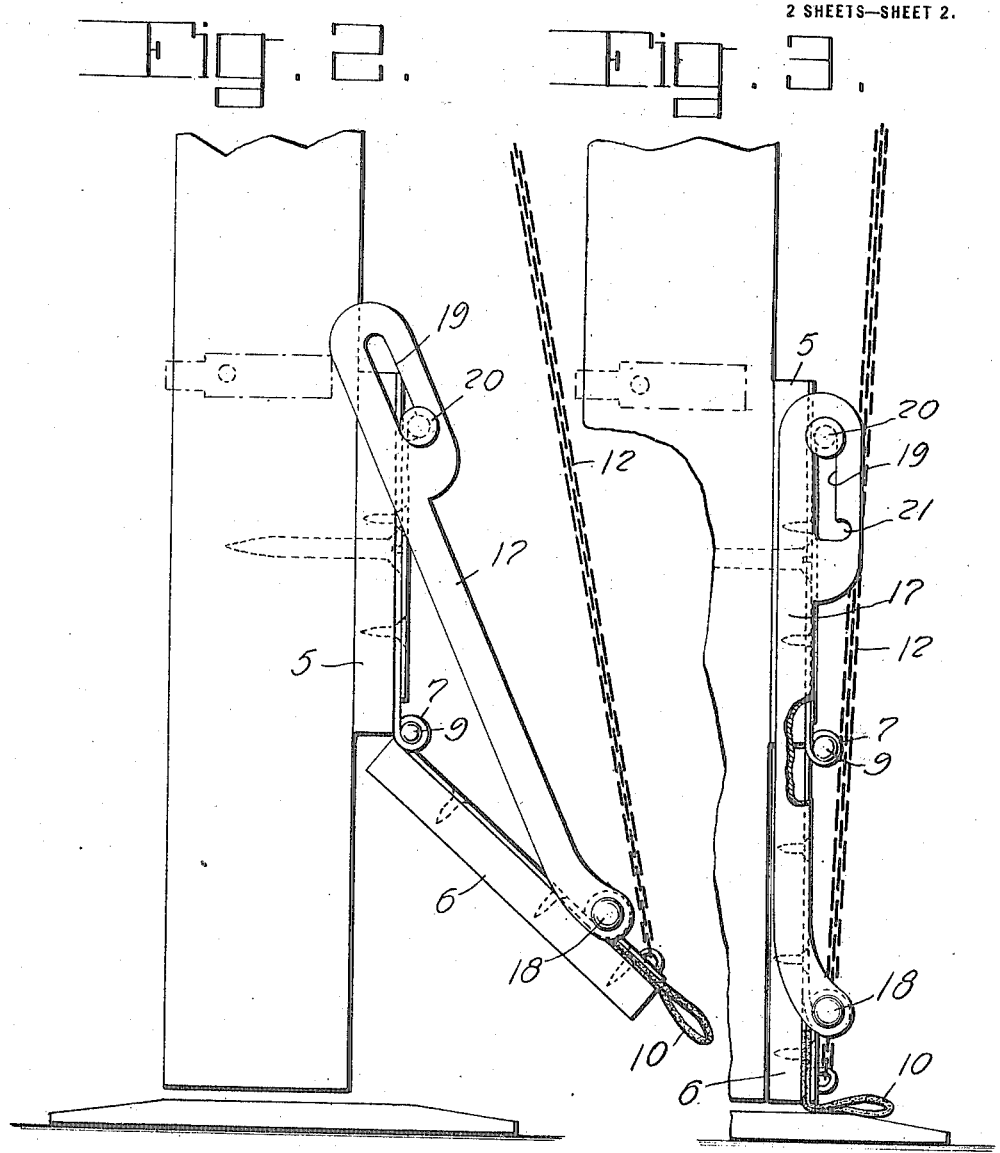
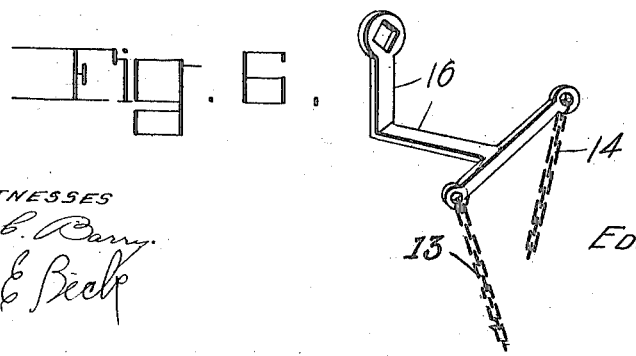
WITNESSES
INVENTOR
EDWARD A. BRADY,
BY
ATTORNEYS

UNITED STATES PATENT OFFICE.

EDWARD ALOYISUS BRADY, OF OREGON CITY, OREGON.

WEATHER-STRIP.

1,264,483.

Specification of Letters Patent.  Patented Apr. 30, 1918.

Application filed May 15, 1917. Serial No. 168,646.

*To all whom it may concern:*

Be it known that I, EDWARD ALOYISUS BRADY, a citizen of the United States, residing at Oregon City, in the county of Clackamas and State of Oregon, have invented new and useful Improvements in Weather-Strips, of which the following is a specification.

My invention is an improvement in weather strips, and has for its object to provide a device of the character specified, for use with outer doors, wherein the weather strip is mounted at the lower edge of the door and is so arranged that when the knob is turned to open the door the weather strip will be lifted out of contact with the floor or door sill, and wherein other mechanism is provided for holding the weather strip in raised position until the door is closed, when the said mechanism will be released to permit the weather strip to take a closed position, and be lowered into place when the knob is released to close the opening beneath the door.

In the drawings:
Figure 1 is a partial front view of the door provided with the improved weather strip, and the parts in section;

Fig. 2 is an edge view of the door showing the weather strip raised;
Fig. 3 is a similar view, with the weather strip in closed position, and with parts broken away;

Fig. 4 is a side view, with parts in section, of a latch for holding the weather strip raised, and with the latch in inoperative position;

Fig. 5 is a similar view showing the latch in operative position; and

Fig. 6 is a perspective view of the mechanism for connection with the knob for operating the weather strip.

The present embodiment of the invention is shown in connection with a door 1 having the usual latch 2 provided with a knob 3 for operating the same, and the knob is secured to the usual shank 4, polygonal in cross section.

The weather strip comprises a fixed portion 5 in the form of a plate, which is secured to the door near the bottom and on the outer face by means of screws, as shown, and a hinged portion 6 which is connected to the fixed portion 5 by hinges 7, and springs 8 are provided in connection with the pintle 9 of the hinges for normally holding the movable portion in the position of Figs. 1 and 3. A weather strip 10 in the form of a strip of rubber, felt or the like, doubled upon itself, is secured to the bottom of the portion 6, by means of a metal strip 11 which is connected to the said portion by screws, as shown, the weather strip being arranged beneath the strip 11.

A flexible member 12, a chain in the present instance, is provided for operating the weather strip, the said chain branching at its upper end into branches 13 and 14, and these branches are connected with eyes at the end of a bar 15. The bar has an angular extension 16 which has a head provided with a polygonal opening for engaging the shank 4 beneath the knob, the arrangement being such that when the shank is turned by the knob in either direction the bar 15 will be swung to cause the chain to lift the weather strip.

A plate 17 is pivoted at one end to the movable portion of the weather strip, as indicated at 18, and the other end is provided with a longitudinally extending slot 19, which is engaged by a headed pin 20 on the fixed section 5 of the weather strip. This slot is provided at its lower end with an extension 21 for engagement by the pin, and it will be evident that when the weather strip is lifted as shown in Fig. 2 the plate will move upwardly to cause the pin to move to the lower end of the slot, where it may engage the extension 21 of the slot, to lock the weather strip in open position.

In operation, when the latch is operated by means of the knob, the bar 15 will be swung, and the weather strip will be lifted. The plate 17 will take the position of Fig. 2, with the pin 20 in the extension 21 of the slot, and mechanism is provided for releasing the plate 17 from the pin 20. This releasing mechanism is a latch bar 22, which is pivoted to a casing 23 and mounted to slide therein, the plate having a pin 24 which engages a slot 25 in the casing wall. The casing is secured to the door casing, just above the pin 20, as shown in Fig. 1.

One end of the plate is reduced to form shoulders 26 at opposite sides of the plate, and the casing is cut away at the end adjacent to the plate 17, at its upper and lower sides. The arrangement is such that when the plate is in the position of Fig. 5 the shoulders 26 will engage the cut-away portions of the casing, to prevent inward movement of the plate, and the free end of the plate will engage the plate 17 to move the same outwardly when the weather strip is lifted, to prevent the pin 20 from holding in the extension.

When it is not desired to have the releasing mechanism in operation the plate is drawn outwardly and permitted to swing down into the position of Fig. 4.

The improved weather strip may be applied to any door by merely attaching the plate 5 to the door, the bar 15 to the knob, and by inserting the casing 23 in an opening in the door casing. In order to fit the weather strip it is only necessary to place the parts in the position of Fig. 3 and connect the plate 5 to the door.

It will be understood that when the knob is turned, the weather strip is raised in the position of Fig. 2, and locked in such position until the door is closed, when, if the latch is in the position of Fig. 5, the plate 17 will be moved to release the pin 20 from the notch 21, and the weather strip will drop into the position of Fig. 3.

When it is desired to lift the weather strip up with the door closed, this plate 22 is moved into the position of Fig. 4, when it will no longer engage the plate 17. When the knob is turned to raise the weather strip, with the trip mechanism shown in Figs. 4 and 5 in the position of Fig. 5, no further attention to the weather strip is required, the plate 17 and the pin 20 holding it lifted until the door is closed. It will be understood that the latch might be arranged to extend out of the casing, that is, extend perpendicularly from the inner side of the casing.

I claim:

In combination with a door, of a weather strip hinged to the lower end of the door for closing the space between the door and the sill, springs for normally holding the weather strip closed, means for connection with the knob of the door for lifting the weather strip, means for locking the weather strip in open position controlled by the lifting of the strip, means operated by the closing of the door for releasing the locking means, and a releasable device for restraining the operation of the said releasing means.

EDWARD ALOYISUS BRADY.

Copies of this patent may be obtained for five cents each, by addressing the "Commissioner of Patents, Washington, D. C."